(12) United States Patent
Hebert et al.

(10) Patent No.: US 8,511,136 B2
(45) Date of Patent: Aug. 20, 2013

(54) GRIPPER ASSEMBLY FOR A MANIPULATOR AND METHOD OF USE

(75) Inventors: David Hebert, Shrewsbury, MA (US); Matthew Louis Foley, II, Savannah, GA (US); Chris Meyers, Savannah, GA (US); Diane Pham, San Diego, CA (US)

(73) Assignee: Firth Rixson Limited, East Hartford, CT (US)

( * ) Notice: Subject to any disclaimer, the term of this patent is extended or adjusted under 35 U.S.C. 154(b) by 0 days.

(21) Appl. No.: 13/346,227

(22) Filed: Jan. 9, 2012

(65) Prior Publication Data
US 2013/0174632 A1 Jul. 11, 2013

(51) Int. Cl.
*B21D 43/10* (2006.01)
(52) U.S. Cl.
USPC .................................. 72/422; 72/361; 72/420
(58) Field of Classification Search
USPC .................. 72/311, 361, 407, 408, 420, 421, 72/422, 431, 446, 449, 465.1, 466, 466.8
See application file for complete search history.

(56) References Cited

U.S. PATENT DOCUMENTS

| | | | |
|---|---|---|---|
| 4,557,661 A | 12/1985 | Fischer et al. | |
| 4,776,199 A | 10/1988 | Schubert | |
| 4,938,052 A * | 7/1990 | Young et al. | 72/361 |
| 4,961,336 A | 10/1990 | Wilson et al. | |
| 5,138,865 A | 8/1992 | Codatto | |
| 6,619,642 B2 | 9/2003 | Cannon et al. | |
| 7,168,282 B2 * | 1/2007 | McLean | 72/356 |
| 7,469,568 B2 * | 12/2008 | Reissenweber | 72/422 |

FOREIGN PATENT DOCUMENTS

| | | |
|---|---|---|
| DE | 202005000596 U1 | 6/2005 |
| GB | 2278825 A | 12/1994 |

OTHER PUBLICATIONS

International Search Report & Written Opinion issued in International Application No. PCT/US2013/020482 dated Apr. 24, 2013; 11 pages

* cited by examiner

*Primary Examiner* — David B Jones
(74) *Attorney, Agent, or Firm* — Cantor Colburn LLP

(57) ABSTRACT

A gripper assembly for a forging manipulator includes a main body configured to be in operative communication with the manipulator; a contact plate attached to the main body and configured to be in physical communication with a heated metal part; and an insulating plate disposed between the main body and the contact plate, wherein the insulating plate is configured to substantially prevent heat transfer from the heated metal part to the main body.

18 Claims, 2 Drawing Sheets

GRIPPER ASSEMBLY FOR A MANIPULATOR AND METHOD OF USE

BACKGROUND

The present disclosure generally relates to a gripper assembly for a manipulator and methods for using the gripper assembly. More particularly, the present disclosure relates to an insulated gripper assembly of a manipulator for manipulating metal ingots during forging.

In metal forging processes, a mechanical hand, also known as a manipulator, has to pick up a rough or part-finished component and transfer it to a downstream work station. The metal parts begin as metal ingots that are heated in furnaces to temperatures over 1500 degrees Fahrenheit (F). As such, manipulators must be used to then transfer the metal ingots (also known as mults or blockers) to downstream work stations in the process, such as the forging dies, cooling stations, and the like.

Such manipulators are known in forging processes and generally include, in their broadest form, a mechanical arm having at least two cooperating jaws or clamping devices positioned at one end thereof. These clamping devices can also be known as gripper assemblies. Gripper assemblies are generally arranged in diametrically opposed pairs and the manipulator includes an actuator means for moving each pair in unison and with equal force between retain and release positions. The actuators or displacement means, such as piston-cylinder units, act directly or by way of wedges, links or push rods, upon the gripper assembly to effect closure of the gripper assemblies about the heated part. Current manipulators typically comprise robotic arms able to move in several planes with at least one gripper pair disposed thereon being able to pick up the hot metal part, transfer it to another work station, and, in some cases, rotate the part to a desired position for placement in the work station.

During transfer of the metal ingot from one portion of the forging process to another, such as from the furnace to the die, heat is transferred from the metal ingot to the gripper assembly of the manipulator. The manipulators have a lower temperature than the metal ingots and, therefore, even with a short transfer time, significant heat is transferred from the hot ingot to the cooler manipulator. Transfer of heat from the metal ingot is undesirable, because the metal needs to be kept at a certain, uniform temperature in order for proper formation of the part into the desired shape in the forging process. When heat is lost from those portions of the ingot in contact with the manipulator, the metal ingot will have an uneven temperature profile. The differences in temperature throughout the metal ingot can cause problems (e.g., irregularities) in the physical characteristics of the forged part. This problem can be particularly acute in the forging of smaller parts that will lose heat more quickly than large pieces of metal. Moreover, repeated cycles of heating and cooling the gripper assemblies and manipulator arms can degrade components over time.

Thus, it is desirable for the metal ingots in a forging process to be transferred from one portion of the process to the next while maintaining a substantially uniform temperature profile throughout the metal. As such, there is a need for a gripper assembly and method that substantially reduces the heat transfer between a metal ingot and the manipulator when transferring parts in the forging process.

BRIEF SUMMARY

Disclosed herein are systems and methods for transferring a heated metal part in a forging process. In one embodiment, a gripper assembly for a forging manipulator includes a main body configured to be in operative communication with the manipulator; a contact plate attached to the main body and configured to be in physical communication with a heated metal part; and an insulating plate disposed between the main body and the contact plate, wherein the insulating plate is configured to substantially prevent heat transfer from the heated metal part to the main body.

In another embodiment, a forging manipulator for transferring a heated metal part in a forging process includes a pair of manipulator arms having a base end and a distal end; and a gripper assembly in operative communication with the distal end of each manipulator arm, wherein the gripper assembly comprises a main body pivotably attached to the distal end; a contact plate attached to the main body and configured to be in physical communication with the heated metal part; and an insulating plate disposed between the main body and the contact plate, wherein the insulating plate is configured to substantially prevent heat transfer from the heated metal part to the main body, wherein the pair of manipulator arms are configured to move toward one another to a position effective for the gripper assemblies to apply a clamping force to the heated metal part.

A method of transferring a heated metal part in a forging process includes securing the heated metal part between a pair of gripper assemblies, wherein each of the gripper assemblies include a main body pivotably attached to the distal end; a contact plate attached to the main body and configured to be in physical communication with the heated metal part; and an insulating plate disposed between the main body and the contact plate; moving the heated metal part from a first location to a second location in the forging process, wherein the insulating plate of each gripper assembly substantially prevents heat transfer from the heated metal part to the main body during the moving.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Disclosed herein are gripper assemblies and methods of their use with manipulators for manipulating metal parts in a forging process. More particularly, the gripper assemblies and methods are configured to reduce the heat transfer from the heated metal ingot to the gripper assembly compared to current manipulators employed in metal forging processes. The gripper assemblies and methods disclosed herein can be particularly advantageous in the manipulation of smaller metal components where rapid cooling of the component via heat transfer to the manipulator is an issue.

The production of metal parts, such as turbine components, generally begins with heating of a metal ingot at very high temperatures in a furnace. While the metal ingot is at the desired high temperature, it can be shaped into the profile of the part. In one embodiment, the metal ingot has a temperature of about 1500° F. to about 2100° F. The metal ingot is cast or forged into the desired shape under heat and pressure. In order to transfer the heated metal ingot from the furnace to the casting die, a manipulator is used. The manipulator generally includes, in its broadest form, a mechanical arm or pair of arms having at least two cooperating jaws or clamping devices positioned at one end thereof. The clamping devices can also be known as gripper assemblies, which are the focus of the present disclosure. It is to be understood that the gripper assemblies described herein can be used with any standard manipulator for transferring metal ingots in a forging process. The gripper assembly is generally disposed at the distal end of an arm of the manipulator and acts as one-half of a mechanical hand for grasping the hot metal ingot or the cast metal part.

Figure 1:
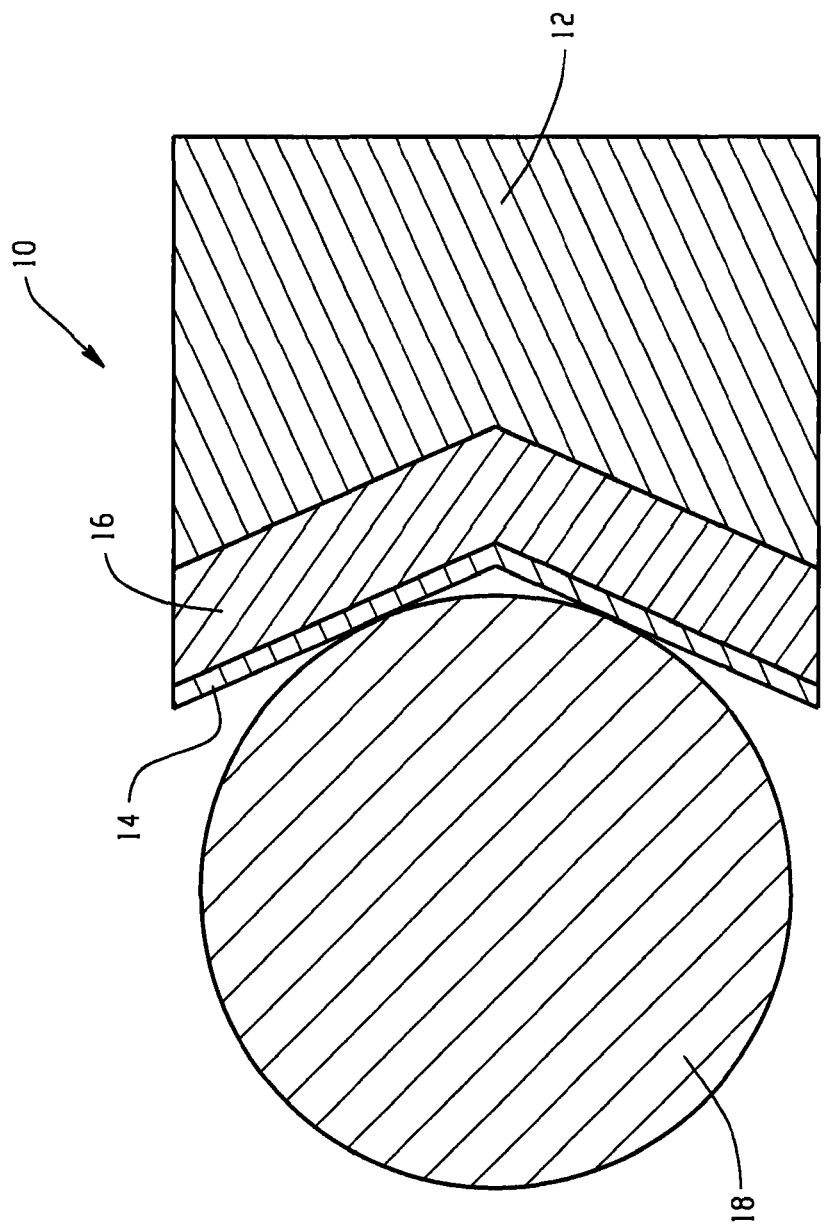
FIG. 1 schematically illustrates a gripper assembly in accordance with an embodiment of the present disclosure.

Referring to FIG. 1, there is schematically illustrated a gripper assembly 10 in accordance with one embodiment for transferring a heated metal part between portions of a forging process. The gripper assembly is configured to move toward and away from the metal part such that when the gripper assembly is used in conjunction with a second gripper assembly or another type of clamping member, the gripper assembly can apply a clamping force to the metal part and move it as desired. The metal part can include a metal ingot, mult, blocker, forged component, and the like. Transferring the heated metal part between portions of the forging process can include moving the part from the furnace to the die for forging, from the die to a cooling station, and the like.

The gripper assembly comprises a main body 12, a contact plate 14, and an insulating plate 16 disposed there between. The contact plate 14 is configured to be in physical communication with the metal part 18. The contact plate 14 has a shape configured to frame the metal part 18, such that when the part is clamped between the gripper assembly 10 and a second gripper assembly (not shown), the part is supported and can be transferred to a new location with substantially no movement of the part between the contact plate 14 and the second gripper assembly. In one embodiment, the contact plate 14 can have surface enhancements, such as machined grooves, disposed on the contact surface of the plate to improve the gripping force between the contact plate and the metal part. In one embodiment, the contact plate 14 has a v-shape and is configured for gripping a substantially cylindrical metal part.

The contact plate 14 is configured to have a thickness sufficient to withstand the heat from the metal part 18, but not so thick as to act as a heat sink and absorb all the heat therefrom. In one embodiment, the contact plate 14 has a thickness of about 0.1 inches to about 1.0 inch; specifically about 0.25 inches to about 0.75 inches. The contact plate can be formed of any material capable of clamping the heated metal part 18 without melting, deforming, or otherwise changing in properties due to heat transfer between the metal part and the plate. Exemplary materials for the contact plate 14 include, without limitation, steels, such as stainless steel, and alloys, such as copper, nickel, iron and cobalt-based alloys, or a combination thereof. For example, steels for the contact plate 14 can include, without limitation, stainless steels such as American Iron and Steel Institute (AISI) steels: AISI 304 stainless steel, 310 stainless steel, 316 stainless steel, AISI 347 stainless steel, AISI 405 stainless steel, AISI 410 stainless steel, Alloy 450 stainless steel, and the like. Exemplary alloys can include nickel-based superalloys that include at least nickel (Ni), and at least one component from the group consisting of cobalt (Co), chromium (Cr), aluminum (Al), tungsten (W), molybdenum (Mo), titanium (Ti), tantalum (Ta), zirconium (Zr), niobium (Nb), rhenium (Re), carbon (C), boron (B), hafnium (HO, and iron (Fe). Examples of nickel-based superalloys are designated by the trade names Haynes® and Hasteloy® produced by Haynes International, Inc., Incoloy®, Inconel®, Nimonic®, and Udimet® produced by Special Metals Corp., Rene® (e.g., Rene®80, Rene®95, Rene®142, and Rene®N5 alloys) produced by Reade, and include directionally solidified and single crystal superalloy.

The insulating plate 16 is sandwiched between the contact plate 14 and the main body 12. The insulating plate 16 is configured to resist heat transfer from the metal part 18 to the main body 12 of the gripper assembly 10. In current gripper assemblies, the contact plate is disposed in direct physical communication with the main body of the gripper. The thin contact plate touching the heated metal part will heat up very quickly and that heat will eventually transfer into the main body of the gripper. In order to prevent this rapid loss of heat from the metal part, the gripper assembly 10 of the present disclosure comprises the insulating plate 16 disposed between the contact plate 14 and the main body 12. The insulating plate 16 resists heat transfer through the contact plate 14 into the main body 12, thereby reducing heat transfer from the heated metal part 18, which would otherwise occur without the insulating plate 16. The contact plate 14 and the main body 12 are disposed on either side of the insulating plate 16 and the three components are compressed or otherwise sealingly engaged, such that no gaps exist between the main body 12, the insulating plate 16 and the contact plate 14. By sealing the three components together, the resistance to thermal conductivity through the gripper assembly 10 is further reduced, as any air between the components would allow for faster heat transfer. Moreover, in one embodiment, the gripper assembly 10 is constructed such that the insulating layer 16 is removable from the assembly, such that the insulating plate 16 can be easily replaced and/or reconfigured, such as adding a plate of different thickness or thermal conductivity.

The insulating plate 16 is configured to have a thickness sufficient to substantially prevent the transfer of heat from the heated metal part 18 to the main body 12. As used herein "prevent" is generally intended to mean resist or impede heat transfer from the contact plate to the main body. In one embodiment, the heat transfer in the gripper assembly 10 is greater than or equal to 50% less; specifically greater than or equal to 75% less; more specifically greater than or equal to 90% less; and most specifically greater than or equal to 95% less than a gripper assembly without an insulating plate. In one embodiment, the insulating plate 16 has a thickness of about 0.1 inches to about 5.0 inches; specifically about 0.5 inches to about 2.5 inches; and more specifically about 1.0 inch. The insulating plate 16 can be formed of any material capable of substantially preventing thermal conduction from the contacting plate 14 to the main body 12, or in other words, materials having high thermal resistivity and suitable for sandwiching between metal components (e.g., rigid insulating materials). In one embodiment, the insulating plate has a thermal conductivity of about 0.01 Btu per hour-degrees Fahrenheit-foot (Btu/(h-° F.-ft)) to about 30 Btu/(h-° F.-ft); specifically about 0.025 Btu/(h-° F.-ft) to about 15 Btu/(h-° F.-ft); and more specifically about 0.05 Btu/(h-° F.-ft) to about 1 Btu/(h-° F.-ft). Exemplary thermally insulating materials include, without limitation, ceramics, such as silicon-bearing ceramics and ceramic matrix composites. In some embodiments, the insulating plate 16 comprises a ceramic material, such as an oxide. For example, aluminosilicate materials may be selected because of their thermal resistivity and utility in such high temperature applications as forging of turbomachinery components. In certain embodiments, the insulating plate 16 comprises a rare-earth aluminosilicate, and the rare-earth aluminosilicate can comprise at least one element selected from the group consisting of yttrium, scandium, gadolinium, dysprosium, holmium, erbium, thulium, ytterbium, and lutetium. Exemplary insulating plate materials also include, but are not limited to, silicon carbide, silicon nitride, silicon carbonitride, silicon oxynitride, silicon boron carbonitride, boron nitride, boron carbide, boron carbonitride, silicon oxycarbide, and the like.

The main body 12 of the gripper assembly 10 is disposed on a side of the insulating plate 16 opposite the contact plate 14. The main body 12 is configured to be attached to the manipulator. More specifically, the main body 12 is in operative communication with manipulator arm, which extends from the frame of the manipulator. The main body 12 of the gripper assembly 10 is pivotablly connected to the manipulator arm, thereby permitting movement of the gripper assembly relative to the manipulator arm. In operation, the gripper assembly, pivotable on the manipulator arm, is disposed opposite a second gripper assembly on a second manipulator arm. The pair of manipulator arms are configured to move toward one another to a position wherein the two gripping assemblies cooperate to grasp a heated metal part located therebetween. In one embodiment, the second gripper assembly is a mirror image of the first gripper assembly 10, in a diametrically opposed arrangement such that the manipulator arm pair moves the two gripper assemblies in unison and with equal force between retain and release positions about the heated metal part. The main body 12 can have any size and shape sufficient to be operatively coupled to the manipulator and support the gripper assembly. Like the contact plate 14, the main body 12 can be formed of steel or alloys. For example, steels for the main body 12 can include, without limitation, AISI 316 stainless steel, AISI 4140 stainless steel, and the like.

Figure 2:
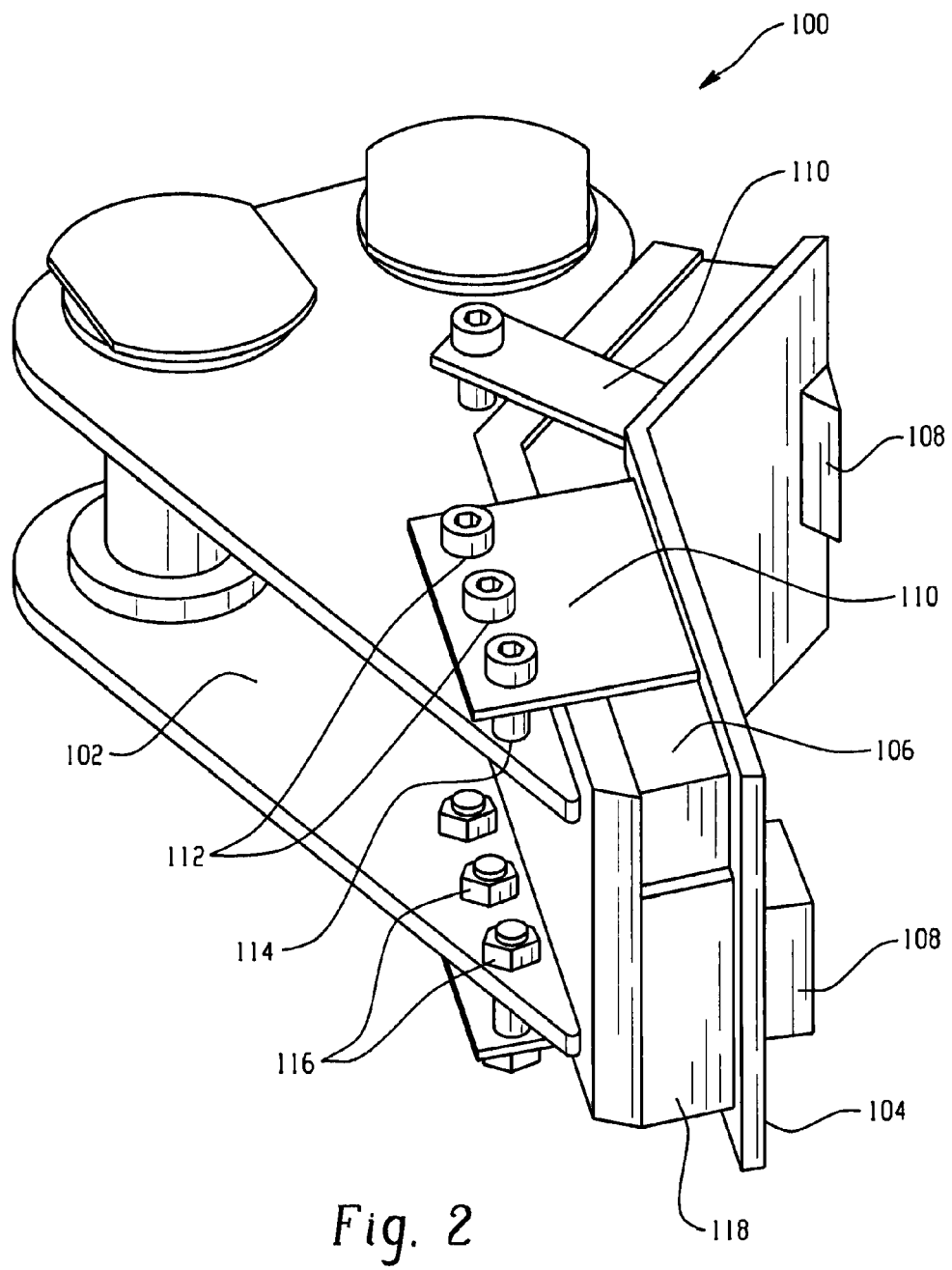
FIG. 2 schematically illustrates a gripper assembly in accordance with another embodiment of the present disclosure.

Turning now to FIG. 2, another embodiment of a gripper assembly 100 is schematically illustrated. The gripper assembly 100 comprises a main body 102, a contact plate 104 and an insulating plate 106 disposed therebetween. The contact plate 104 is similar to that of FIG. 1, but the contact plate 102 also includes a plurality of edge guides 108 disposed on the outer surface of the contact plate 104. The edge guides 108 are configured to aid in directing the heated metal part to the center of the v-shaped plate and help to hold the part in place between the two gripper assemblies. In certain embodiments, the edge guides 108 are useful when smaller metal parts are being moved with the assembly. The edge guides can aid the operator of the gripper assembly 100 to ensure that the force of the grippers are applied to the center of the small metal part, so as to prevent any asymmetrical deformation thereof. The contact plate 104 further comprises one or more brackets 110 configured to attach to the main body 102 and compress the insulating plate 106 between the two. The mounting brackets 110 can be secured to the main body in any fashion that suitably holds the contact plate 104 and the insulating plate 106 to the main body 102, without allowing gaps to form between the components. In one embodiment, the brackets 110 further comprise apertures 112 configured to align with apertures 114 on the main body 102. A plurality of locking mechanisms 116, such as lock bolts, are inserted in the aligned apertures to removable couple the contact plate 104 to the main body 102. The locking mechanism 116 advantageously permits the contact plate to be readily removed from the main body, which permits replacement of the insulating plate 106 when necessary.

In certain embodiments, one or more support plates 118 are disposed between and in physical communication with the contact plate 104 and the main body 106. The support plate 118 can have the same thickness as the insulating plate 106 and be configured to decrease the shear force on the brackets 110 and locking mechanisms 116 connecting the contact plate 104 to the main body 102. The support plate(s) 118 is effective in moving shear forces experienced by the gripper assembly 100 from the contact plate 104 to the main body 102. The cross-section thickness of the support plate(s) 118 is sufficient to transfer the shear force from the contact plate 104 while minimizing the transfer of heat through the support plate(s) to the main body.

A method of transferring the heated metal part in a forging process includes securing the heated metal part between a pair of gripper assemblies. Each gripper assembly is disposed on a distal end of a manipulator arm, wherein the manipulator arms are configured to move toward one another to a position effective for the gripper assemblies to apply a clamping force to the heated metal part. The main body of each gripper assembly can be pivotably attached to the distal end. The heated metal part, being grasped by the pair of gripper assemblies, can be moved from a first location to a second location in the forging process, and the insulating plate of each gripper assembly substantially prevents heat transfer from the heated metal part to the main body during the move, such that substantially less heat is lost from the metal part than would occur by transfer with non-insulated gripping assemblies. With the insulating plate, the main source of heat loss is to the environment as the part is being transferred from location to location, rather than heat loss through thermal conduction into the gripper assembly. As such, the speed of transfer has an effect on the heat lost from the metal part. In one embodiment, the time of transfer is less than or equal to about 30 seconds; specifically less than or equal to about 15 seconds; and more specifically less than or equal to about 5 seconds. Moreover, heating the gripper assembly can also improve heat transfer. In one embodiment, the gripper assembly is pre-heated to about 800° F. prior to contact with the heated metal part. Any suitable apparatus for heating the gripper assembly can be used such as, for example, a flame burner, electrical induction, and the like.

The invention is further illustrated by the following non-limiting Examples.

EXAMPLES

Example 1

A gripper assembly in accordance with the present invention was used to transfer a cylindrically shaped metal part, which had been heated to 1800° F. in a furnace, to a work station. The gripper assembly included a contact plate having a thermal conductivity of 26 Btu per hour degree Fahrenheit foot (Btu/hr ° F. ft). The contact plate had a thickness of 0.25 inches and a surface area of 45 square inches. The main body of the gripper assembly also had a thermal conductivity of 26 Btu/hr° F. ft, with a thickness of 2 inches and a surface area of 45 square inches. The insulating plate was sandwiched between the contact plate and the main body and had a thickness of 1 inch and the same 45 square inch surface area. The insulating plate had a thermal conductivity of 0.22 Btu/hr ° F. ft.

Comparative Example

The results of Example 1 were compared to a second gripper assembly, the type of assembly used with current forging manipulators. The second gripper assembly did not include an insulating plate disposed between the contact plate and the main body. In other words, the gripper assembly of the comparative example had a contact plate disposed in physical communication with the main body. The non-insulated gripper assembly was also used to transfer the same cylindrically shaped metal part, heated to 1800° F., from the furnace to the work station. The contact plate had a thermal conductivity of 26 Btu/hr ° F. ft, a thickness of 1.25 inches and a surface area of 45 square inches. The main body of the non-insulated gripper assembly also had a thermal conductivity of 26 Btu/hr ° F. ft, with a thickness of 2 inches and a surface area of 45 square inches.

Both the insulated and non-insulated gripper assemblies were pre-heated to a temperature of 800° F. before contact with the heated metal part. Again, the temperature of the metal part in both examples was 1800° F. The heat transfer rate for both the gripper assembly of the present invention and the non-insulated gripper assembly was compared. The results of the comparison are shown in Table 1 below.

TABLE 1

| | Heat Transfer (Btu/second) |
|---|---|
| Example 1 - Insulated | 0.22 |
| Comparative Example - Non-insulated | 8.33 |

As Table 1 shows, far less heat transferred from the metal part to the main body of the gripper assembly in Example 1 compared to the non-insulated gripper assembly of the Comparative Example. In fact, the insulated gripper assembly showed a 97% decrease in heat transfer compared to the non-insulated assembly. As such, the metal part transferred by the gripper assembly of Example 1 retained far more of its initial heat during transfer than when it was transferred by the Comparative Example assembly.

Example 2

The gripper assembly as described in Example 1 above was used to transfer a metal part from a furnace to a work station. A thermal imaging camera was used to document the temperature profile of the metal part after transfer from the furnace to the work station. The thermal image showed the surface was uniform in temperature in locations where it was not contacting the grippers but visibly cold spots were observed at the point of contact, i.e., only four small circles of reduced temperature were evident. and represent minor heat transfer to the contact plate. Compared to a prior art non-insulated gripper, the gripper assembly demonstrated smaller cold spots and a smaller temperature differential.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gripper assembly for a forging manipulator, comprising:
   a main body configured to be in operative communication with the manipulator;
   a contact plate attached to the main body and configured to be in physical communication with a heated metal part; and
   an insulating plate disposed between the main body and the contact plate, wherein the insulating plate is configured to substantially prevent heat transfer from the heated metal part to the main body, wherein the insulating plate comprises a thermal conductivity of about 0.05 Btu/(h-° F.-ft) to about 1 Btu/(h-° F.-ft).

2. The gripper assembly of claim 1, wherein the insulating plate comprises a ceramic.

3. The gripper assembly of claim 2, wherein the ceramic comprises an aluminosilicate, silicon carbide, silicon nitride, silicon carbonitride, silicon oxynitride, silicon boron carbonitride, boron nitride, boron carbide, boron carbonitride, silicon oxycarbide, or a combination comprising at least one of the foregoing.

4. The gripper assembly of claim 1, wherein the insulating plate is removeably attached to the assembly.

5. The gripper assembly of claim 1, wherein the contact plate has a shape configured to conform to the heated metal part.

6. The gripper assembly of claim 5, wherein the contact plate has a v-shape configured to grasp a cylindrically shaped heated metal part.

7. The gripper assembly of claim 1, further comprising one or more support plates disposed between and in physical communication with the contact plate and the main body.

8. The gripper assembly of claim 1, wherein the contact plate further comprises one or more brackets configured to physically attach the contact plate to the main body.

9. The gripper assembly of claim 1, wherein the assembly is free of gaps between the main body, insulating plate and contact plate.

10. The gripper assembly of claim 1, wherein the insulating plate has a thickness of about 0.5 inches to about 2.5 inches and the contact plate has a thickness of about 0.1 inches to about 1.0 inch.

11. The gripper assembly of claim 1, wherein the heat transfer between the heated metal part and the main body is greater than or equal to 50 percent less than that of a gripper assembly without an insulating plate.

12. A forging manipulator for transferring a heated metal part in a forging process, comprising:
   a pair of manipulator arms having a base end and a distal end; and
   a gripper assembly in operative communication with the distal end of each manipulator arm, wherein the gripper assembly comprises:
      a main body pivotably attached to the distal end;
      a contact plate attached to the main body and configured to be in physical communication with the heated metal part; and
      an insulating plate disposed between the main body and the contact plate, wherein the insulating plate is configured to substantially prevent heat transfer from the heated metal part to the main body, wherein the insulating plate comprises a thermal conductivity of about 0.05 Btu/(h-° F.-ft) to about 1 Btu/(h-° F.-ft), and wherein the pair of manipulator arms are configured to move toward one another to a position effective for the gripper assemblies to apply a clamping force to the heated metal part.

13. The forging manipulator of claim 12, wherein the insulating plate comprises an aluminosilicate, silicon carbide, silicon nitride, silicon carbonitride, silicon oxynitride, silicon boron carbonitride, boron nitride, boron carbide, boron carbonitride, silicon oxycarbide, or a combination comprising at least one of the foregoing.

14. The forging manipulator of claim 12, wherein the gripper assembly is free of gaps between the main body, insulating plate and contact plate.

15. The forging manipulator of claim 12, wherein the insulating plate has a thickness of about 0.5 inches to about 2.5 inches and the contact plate has a thickness of about 0.1 inches to about 1.0 inch.

16. The forging manipulator of claim 12, wherein the heat transfer between the heated metal part and the main body is greater than or equal to 50 percent less than that of a gripper assembly without an insulating plate.

17. A method of transferring a heated metal part in a forging process, comprising:
   securing the heated metal part between a pair of gripper assemblies, wherein each of the gripper assemblies comprise:
   a main body pivotably attached to the distal end;
   a contact plate attached to the main body and configured to be in physical communication with the heated metal part; and
   an insulating plate disposed between the main body and the contact plate, wherein the insulating plate comprises a thermal conductivity of about 0.05 Btu/(h-° F.-ft) to about 1 Btu/(h-° F.-ft);
   moving the heated metal part from a first location to a second location in the forging process, wherein the insulating plate of each gripper assembly substantially prevents heat transfer from the heated metal part to the main body during the moving.

18. The method of claim 17, further comprising pre-heating the gripper assemblies prior to securing the heated metal part.

* * * * *